(12) United States Patent
Nitta et al.

(10) Patent No.: US 11,409,082 B2
(45) Date of Patent: Aug. 9, 2022

(54) CAMERA LENS

(71) Applicant: AAC Optics Solutions Pte. Ltd., Singapore (SG)

(72) Inventors: Koji Nitta, Osaka (JP); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 337 days.

(21) Appl. No.: 16/854,903

(22) Filed: Apr. 22, 2020

(65) Prior Publication Data

US 2021/0302696 A1 Sep. 30, 2021

(30) Foreign Application Priority Data

Mar. 25, 2020 (JP) .............................. JP2020-054941

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC ... G02B 13/0045; G02B 9/64; G02B 27/0025
USPC .................................................. 359/708, 750
See application file for complete search history.

(56) References Cited

U.S. PATENT DOCUMENTS

2019/0121098 A1* 4/2019 Zhou ................... G02B 13/0045
2019/0137736 A1* 5/2019 Huh .................... G02B 27/0037

FOREIGN PATENT DOCUMENTS

| CN | 106443986 A | * | 2/2017 | ......... G02B 13/0045 |
| CN | 106443987 A | * | 2/2017 | ......... G02B 13/0045 |
| CN | 207424361 U | * | 5/2018 | |
| CN | 108254890 A | * | 7/2018 | ............. G02B 1/041 |
| CN | 208488592 U | * | 2/2019 | ......... G02B 13/0045 |
| CN | 109581631 A | * | 4/2019 | ......... G02B 13/0045 |
| CN | 109870788 A | * | 6/2019 | ......... G02B 13/0045 |
| CN | 110426822 A | * | 11/2019 | |
| CN | 110456490 A | * | 11/2019 | |
| CN | 110471168 A | * | 11/2019 | ......... G02B 13/0045 |
| CN | 110632742 A | * | 12/2019 | ......... G02B 13/0045 |
| CN | 111061036 A | * | 4/2020 | ......... G02B 13/0015 |
| CN | 111077643 A | * | 4/2020 | ......... G02B 13/0015 |
| WO | WO-2019091170 A1 | * | 5/2019 | ............. G02B 13/00 |

* cited by examiner

*Primary Examiner* — James R Greece
(74) *Attorney, Agent, or Firm* — W&G Law Group (57) ABSTRACT

The present invention provides a camera lens consisting of eight lenses and having a small height, a wide angle, and good optical properties. The camera lens includes, sequentially from an object side, a first lens having a positive refractive power; a second lens having a positive refractive power; a third lens having a negative refractive power; a fourth lens having a positive refractive power; a fifth lens having a negative refractive power; a sixth lens having a positive refractive power; a seventh lens having a positive or negative refractive power; and an eighth lens having a negative refractive power. The camera lens satisfies specific conditions.

5 Claims, 8 Drawing Sheets

CAMERA LENS

TECHNICAL FIELD

The present invention relates to a camera lens, and particularly, to a camera lens, which consists of eight lenses, is suitable for portable module cameras that adopt high-pixel Charge Coupled Device (CCD), Complementary Metal-Oxide Semiconductor Sensor (CMOS), or other imaging elements, and has a small height of TTL (a total optical length)/IH (an image height)<1.35, a wide angle (i.e., a full field of view, hereinafter referred to as 2ω) above 80° and good optical properties.

BACKGROUND

In recent years, various imaging devices using imaging elements such as CCDs and CMOSs are widely applied. With the development of miniaturization and high performance of these imaging elements, it is urgent to develop a camera lens with a small height, a wide angle, and good optical properties.

The technologies in terms of the camera lens consisting of eight lenses and having a small height, a wide angle, and good optical properties are driven to be developed. As a camera lens having a structure of eight lenses, a camera lens is provided to include a first lens having a positive refractive power, a second lens having a positive refractive power, a third lens having a negative refractive power, a fourth lens having a positive refractive power, a fifth lens having a negative refractive power, a sixth lens having a positive refractive power, a seventh lens having a negative refractive power and an eighth lens having a negative refractive power that are sequentially arranged from an object side.

Regarding the camera lens disclosed in the prior art, there is no enough difference between an abbe number of the first lens and an abbe number of the second lens as well as between the abbe number of the second lens and an abbe number of the third lens, so that the height reduction and the wide angle are insufficient.

SUMMARY

A purpose of the present invention is to provide a camera lens consisting of eight lenses and having a small height, a wide angle, and good optical properties.

For the above purpose, the applicant has intensively studied a power configuration of each lens, the difference between the abbe number of the first lens and the abbe number of the second lens, and the difference between the abbe number of the second lens and the abbe number of the third lens, and has obtained a camera lens of the present invention which can solve the technical problems in the related art.

A camera lens according to a first technical solution includes, sequentially from an object side, a first lens having a positive refractive power; a second lens having a positive refractive power; a third lens having a negative refractive power; a fourth lens having a positive refractive power; a fifth lens having a negative refractive power; a sixth lens having a positive refractive power; a seventh lens having a positive or negative refractive power; and an eighth lens having a negative refractive power. The camera lens satisfies following conditions:

$$5.00 \leq v1-v2 \leq 20.00; \text{ and}$$

$$20.00 \leq v2-v3 \leq 30.00,$$

where v1 denotes an abbe number of the first lens;

v2 denotes an abbe number of the second lens; and v3 denotes an abbe number of the third lens.

The camera lens according to a second technical solution further satisfies a following condition:

$$4.00 \leq (d1+d3)/d2 \leq 12.00,$$

where d1 denotes a center thickness of the first lens;

d2 denotes an on-axis distance from an image side surface of the first lens to an object side surface of the second lens; and d3 denotes a center thickness of the second lens.

The camera lens according to a third technical solution further satisfies a following condition:

$$0.30 \leq R3/R4 \leq 0.50,$$

where R3 denotes a curvature radius of an object side surface of the second lens; and R4 denotes a curvature radius of an image side surface of the second lens.

The camera lens according to a fourth technical solution further satisfies a following condition:

$$3.00 \leq |R5/R6| \leq 15.00,$$

where

R5 denotes a curvature radius of an object side surface of the third lens; and

R6 denotes a curvature radius of an image side surface of the third lens.

The camera lens according to a fifth technical solution further satisfies a following condition:

$$0.005 \leq d4/f \leq 0.010,$$

where f denotes a focal length of the camera lens; and d4 denotes an on-axis distance from an image side surface of the second lens to an object side surface of the third lens.

Technical Effects

According to the present invention, particularly provided is a camera lens, which consists of eight lenses, is suitable for portable module cameras that adopt high-pixel CCD, CMOS, or other imaging elements, has a small height of TTL (total optical length)/IH (image height)<1.35, guarantees a wide angle of 2ω>80°, and also has good optical properties.

DESCRIPTION OF EMBODIMENTS

The embodiments of the camera lens according to the present invention will be described below. The camera lens LA is provided with a lens system. The lens system is a eight-lens structure and includes a first lens L1, a second lens L2, a third lens L3, a fourth lens L4, a fifth lens L5, a sixth lens L6, a seventh lens L7 and an eighth lens L8 that are arranged from an object side to an image side. A glass plate GF is arranged between the eighth lens L8 and an image plane. A cover glass plate and various filters can be considered as the glass flat plate GF. In the present invention, the glass plate GF may be arranged at different positions, or may also be omitted.

The first lens L1 is a lens having a positive refractive power, the second lens L2 is a lens having a positive refractive power, the third lens L3 is a lens having a negative refractive power, the fourth lens L4 is a lens having a positive refractive power, the fifth lens L5 is a lens having a negative refractive power, the sixth lens L6 is a lens having a positive refractive power, the seventh lens L7 is a lens having a positive or negative refractive power, and the eighth lens L8 is a lens having a negative refractive power. In order to correct various aberrations, it is desirable to design all surfaces of these eight lenses as aspherical surfaces.

The camera lens LA satisfies the following conditions (1) to (2):

$$5.00 \leq v1-v2 \leq 20.00 \quad (1); \text{ and}$$

$$20.00 \leq v2-v3 \leq 30.00 \quad (2),$$

where v1 denotes an abbe number of the first lens;
v2 denotes an abbe number of the second lens; and
v3 denotes an abbe number of the third lens.

The condition (1) specifies a difference between the abbe number v1 of the first lens L1 and the abbe number v2 of the second lens L2. If it is outside the range of condition (1), a correction of on-axis and off-axis aberrations becomes difficult due to wide-angle and low-height, which is not preferable.

The condition (2) specifies a difference between the abbe number v2 of the second lens L2 and the abbe number v3 of the third lens L3. If it is outside the range of condition (2), a correction of on-axis and off-axis aberrations becomes difficult due to wide-angle and low-height, which is not preferable.

The camera lens LA satisfies the following condition (3):

$$4.00 \leq (d1+d3)/d2 \leq 12.00 \quad (3),$$

where d1 denotes a center thickness of the first lens;
d2 denotes an on-axis distance from an image side surface of the first lens to an object side surface of the second lens; and
d3 denotes a center thickness of the second lens.

The condition (3) specifies a relationship among the center thickness of the first lens L1, the center thickness of the second lens L2 and the on-axis distance from the image side surface of the first lens L1 to the object side surface of the second lens L2. If it is within the range of condition (3), a camera lens having a small height, a wide angle, and good optical properties can be easily achieved, which is preferable.

The camera lens LA satisfies the following condition (4):

$$0.30 \leq R3/R4 \leq 0.50 \quad (4),$$

where R3 denotes a curvature radius of the object side surface of the second lens L2; and
R4 denotes a curvature radius of an image side surface of the second lens L2.

The condition (4) specifies a ratio of the curvature radius R3 of the object side surface of the second lens L2 to the curvature radius R4 of the image side surface of the second lens L2. If it is within the range of condition (4), a camera lens having a small height, a wide angle, and good optical properties can be easily achieved, which is preferable.

The camera lens LA satisfies the following condition (5):

$$0.30 \leq R3/R4 \leq 0.50 \quad (5),$$

where R5 denotes a curvature radius of an object side surface of the third lens L3; and
R6 denotes a curvature radius of an image side surface of the third lens.

The condition (5) specifies a ratio of the curvature radius R5 of the object side surface of the third lens L3 to the curvature radius R6 of the object side surface of the third lens L3. If it is within the range of condition (5), a camera lens having a small height, a wide angle, and good optical properties can be easily achieved, which is preferable.

The camera lens LA satisfies the following condition (6):

$$0.005 \leq d4/f \leq 0.010 \quad (6),$$

where f denotes a focal length of the camera lens; and
d4 denotes an on-axis distance from the image side surface of the second lens L2 to the object side surface of the third lens L3.

The condition (6) specifies a ratio of the on-axis distance from the image side surface of the second lens L2 to the object side surface of the third lens L3 to the focal length f of the camera lens. If it is within the range of condition (6), a camera lens having a small height, a wide angle, and good optical properties can be easily achieved, which is preferable.

The eight lenses of the camera lens LA satisfy the above construction and conditions, so as to obtain the camera lens consisting of eight lenses and having a small height of TTL (a total optical length)/IH (an image height)<1.35, 2ω>80°, and good optical properties.

EMBODIMENTS

The camera lens LA of the present invention will be described with reference to the embodiments below. The reference signs described in the embodiments are listed below. In addition, the distance, radius and center thickness are all in a unit of mm.

f: focal length of the camera lens LA;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
f7: focal length of the seventh lens L7;
f8: focal length of the eighth lens L8;
Fno: F number;
2ω: full field of view;

S1: aperture;

R: curvature radius of an optical surface, a central curvature radius for a lens;

R1: curvature radius of an object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of an object side surface of the fourth lens L4;

R8: curvature radius of an image side surface of the fourth lens L4;

R9: curvature radius of an object side surface of the fifth lens L5;

R10: curvature radius of an image side surface of the fifth lens L5;

R11: curvature radius of an object side surface of the sixth lens L6;

R12: curvature radius of an image side surface of the sixth lens L6;

R13: curvature radius of an object side surface of the seventh lens L7;

R14: curvature radius of an image side surface of the seventh lens L7;

R15: curvature radius of an object side surface of the eighth lens L8;

R16: curvature radius of an image side surface of the eighth lens L8;

R17: curvature radius of an object side surface of the glass plate GF;

R18: curvature radius of an image side surface of the glass plate GF;

d: center thickness or distance between lenses;

d0: on-axis distance from the aperture S1 to the object side surface of the first lens L1;

d1: center thickness of the first lens L1;

d2: on-axis distance from the image side surface of the first lens L1 to the object side surface of the second lens L2;

d3: center thickness of the second lens L2;

d4: on-axis distance from the image side surface of the second lens L2 to the object side surface of the third lens L3;

d5: center thickness of the third lens L3;

d6: on-axis distance from the image side surface of the third lens L3 to the object side surface of the fourth lens L4;

d7: center thickness of the fourth lens L4;

d8: on-axis distance from the image side surface of the fourth lens L4 to the object side surface of the fifth lens L5;

d9: center thickness of the fifth lens L5;

d10: on-axis distance from the image side surface of the fifth lens L5 to the object side surface of the sixth lens L6;

d11: center thickness of the sixth lens L6;

d12: on-axis distance from the image side surface of the sixth lens L6 to the object side surface of the seventh lens L7;

d13: center thickness of the seventh lens L7;

d14: on-axis distance from the image side surface of the seventh lens L7 to the object side surface of the eighth lens L8;

d15: center thickness of the eighth lens L8;

d16: on-axis distance from the image side surface of the eighth lens L8 to the object side surface of the glass plate GF;

d17: center thickness of the glass plate GF;

d18: on-axis distance from the image side surface of the glass plate GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

nd8: refractive index of d line of the eighth lens L8;

ndg: refractive index of d line of the glass plate GF;

v: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

vg: abbe number of the glass plate GF;

TTL: total optical length (on-axis distance from the object side surface of the first lens L1 to the image plane); and LB: on-axis distance from the image side surface of the eighth lens L8 to the image plane (including the thickness of the glass plate GF).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (7)$$

For convenience, the aspheric surface of each lens surface uses the aspheric surface defined in the equation (7). However, the present invention is not limited to the aspherical polynomial defined in the equation (7).

First Embodiment

Figure 1:
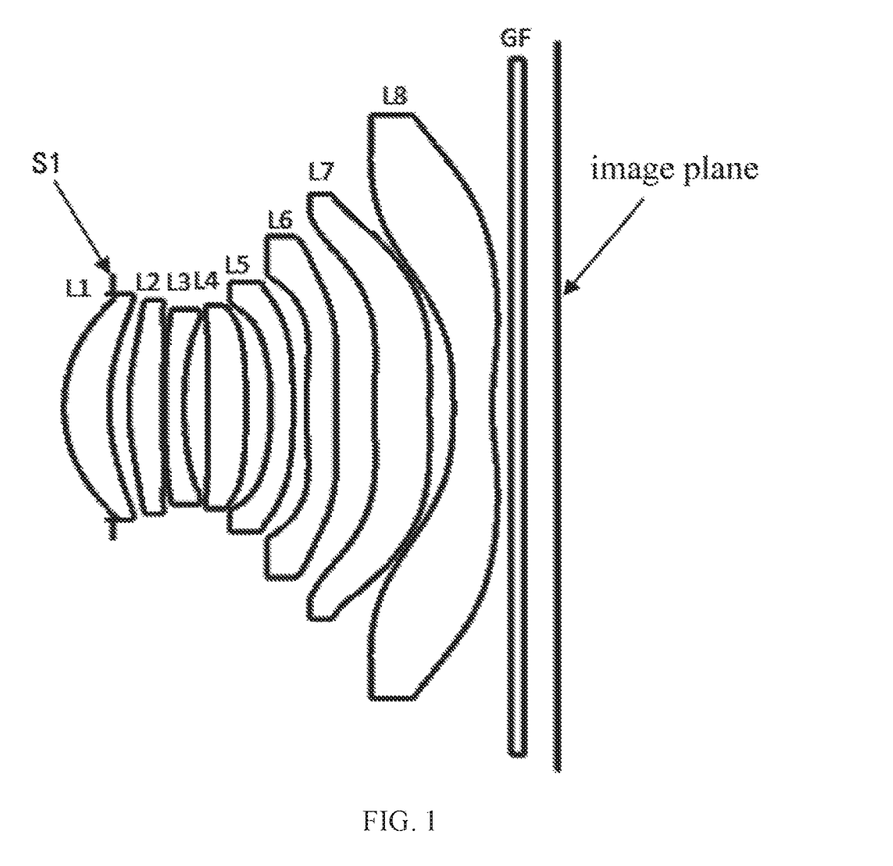
FIG. 1 is a schematic diagram of a camera lens LA according to a first embodiment of the present invention.

FIG. 1 is a schematic diagram of a camera lens LA according to a first embodiment of the present invention. The curvature radiuses R of the image side surfaces and object side surfaces of the first lens L1 to the eighth lens L8 of the camera lens LA according to the first embodiment, the center thicknesses of the lenses, or distances d between the lenses, refractive indexes nd, abbe numbers v are shown in Table 1; conic coefficients k and aspheric coefficients are shown in Table 2; and 2ω, Fno, f, f1, f2, f3, f4, f5, f6, f7, f8, TTL, and IH are shown in Table 3.

TABLE 1

|    | R       | d   |        | nd  |        | vd |       | Effective radius (mm) |
|----|---------|-----|--------|-----|--------|----|-------|-----------------------|
| S1 | ∞       | d0= | −0.772 |     |        |    |       | 1.922 |
| R1 | 2.45002 | d1= | 0.717  | nd1 | 1.5315 | v1 | 54.55 | 1.922 |
| R2 | 3.79117 | d2= | 0.310  |     |        |    |       | 1.865 |
| R3 | 4.49100 | d3= | 0.539  | nd2 | 1.7725 | v2 | 49.50 | 1.820 |

TABLE 1-continued

|  | R | d |  | nd |  | υd | Effective radius (mm) |
|---|---|---|---|---|---|---|---|
| R4 | 14.72618 | d4= 0.037 |  |  |  |  | 1.715 |
| R5 | 19.05564 | d5= 0.300 | nd3 | 1.6613 | υ3 | 20.37 | 1.662 |
| R6 | 6.24775 | d6= 0.378 |  |  |  |  | 1.518 |
| R7 | 77.54421 | d7= 0.605 | nd4 | 1.5444 | υ4 | 55.82 | 1.570 |
| R8 | −14.51182 | d8= 0.388 |  |  |  |  | 1.732 |
| R9 | −6.41248 | d9= 0.354 | nd5 | 1.6700 | υ5 | 19.39 | 1.759 |
| R10 | −15.60690 | d10= 0.209 |  |  |  |  | 2.127 |
| R11 | 10.40881 | d11= 0.472 | nd6 | 1.5346 | υ6 | 55.69 | 2.245 |
| R12 | 46.42478 | d12= 0.605 |  |  |  |  | 2.910 |
| R13 | 16.03309 | d13= 0.874 | nd7 | 1.6700 | υ7 | 19.39 | 3.290 |
| R14 | 44.92545 | d14= 0.382 |  |  |  |  | 3.616 |
| R15 | −12.18257 | d15= 0.613 | nd8 | 1.5346 | υ8 | 55.69 | 4.550 |
| R16 | 5.30055 | d16= 0.300 |  |  |  |  | 4.977 |
| R17 | ∞ | d17= 0.210 | ndg | 1.5168 | υg | 64.20 | 5.848 |
| R18 | ∞ | d18= 0.524 |  |  |  |  | 5.920 |

Reference wavelength = 558 nm

TABLE 2

|  | Conic coefficient | Aspherical coefficient | | | |
|---|---|---|---|---|---|
|  | k | A4 | A6 | A8 | A10 |
| R1 | 4.3529E−03 | −5.2480E−03 | 1.1331E−02 | −1.6042E−02 | 1.7311E−02 |
| R2 | 0.0000E+00 | 1.1275E−04 | −1.4085E−02 | 2.6940E−02 | −3.2573E−02 |
| R3 | 0.0000E+00 | −1.0323E−02 | 1.7281E−03 | −7.7723E−03 | 8.4984E−03 |
| R4 | 0.0000E+00 | −2.6717E−02 | 1.0922E−02 | 5.4654E−03 | −1.8104E−02 |
| R5 | 0.0000E+00 | −1.8094E−02 | 3.4748E−02 | −3.4719E−02 | 3.2084E−02 |
| R6 | 0.0000E+00 | 6.2978E−03 | 2.2070E−02 | −4.4120E−02 | 5.7842E−02 |
| R7 | 0.0000E+00 | 9.0881E−04 | −4.0277E−02 | 9.6028E−02 | −1.4019E−01 |
| R8 | 0.0000E+00 | −8.8423E−03 | −8.1964E−03 | 9.4530E−03 | −1.5080E−02 |
| R9 | 0.0000E+00 | −6.8481E−03 | −4.2330E−02 | 7.9345E−02 | −9.7256E−02 |
| R10 | 0.0000E+00 | −4.9384E−03 | −4.0530E−02 | 4.2030E−02 | −2.3551E−02 |
| R11 | 0.0000E+00 | 1.2040E−02 | −5.8470E−02 | 4.3700E−02 | −2.1515E−02 |
| R12 | 0.0000E+00 | 8.3499E−03 | −2.3925E−02 | 1.0700E−02 | −2.8867E−03 |
| R13 | 0.0000E+00 | −2.1065E−02 | 7.4224E−04 | −1.6784E−03 | 8.9724E−04 |
| R14 | 0.0000E+00 | −1.9168E−02 | 1.8789E−03 | −1.3908E−03 | 5.3734E−04 |
| R15 | 0.0000E+00 | −4.8169E−02 | 1.1323E−02 | −1.8894E−03 | 2.3828E−04 |
| R16 | 0.0000E+00 | −4.1698E−02 | 9.0533E−03 | −1.2204E−03 | 1.2554E−04 |

|  | Aspherical coefficient | | | | |
|---|---|---|---|---|---|
|  | A12 | A14 | A16 | A18 | A20 |
| R1 | −1.0687E−02 | 4.2465E−03 | −1.0582E−03 | 1.5098E−04 | −9.4704E−06 |
| R2 | 2.4175E−02 | −1.1228E−02 | 3.1764E−03 | −4.9646E−04 | 3.2509E−05 |
| R3 | −6.0506E−03 | 2.6759E−03 | −6.3660E−04 | 8.8110E−05 | −1.8468E−06 |
| R4 | 1.6855E−02 | −8.4451E−03 | 2.5115E−03 | −4.2926E−04 | 3.3344E−05 |
| R5 | −2.5689E−02 | 1.4907E−02 | −5.4500E−03 | 1.0908E−03 | −6.9534E−05 |
| R6 | −5.0354E−02 | 2.8267E−02 | −9.7178E−03 | 1.8475E−03 | −1.4610E−04 |
| R7 | 1.2704E−01 | −7.2249E−02 | 2.5168E−02 | −4.9118E−03 | 4.1168E−04 |
| R8 | 1.3300E−02 | −7.2423E−03 | 2.3923E−03 | −4.3871E−04 | 3.3831E−05 |
| R9 | 7.6456E−02 | −3.9116E−02 | 1.2453E−02 | −2.2366E−03 | 1.7234E−04 |
| R10 | 7.5220E−03 | −1.2233E−03 | 3.4165E−05 | 1.7089E−05 | −1.6866E−03 |
| R11 | 7.1820E−03 | −1.6172E−03 | 2.3700E−04 | −2.0830E−05 | 8.5061E−07 |
| R12 | 4.9746E−04 | −4.8030E−05 | 1.6640E−06 | 7.9676E−08 | −8.0249E−09 |
| R13 | −2.0872E−04 | 2.5177E−05 | −1.6453E−06 | 5.2540E−08 | −5.9232E−10 |
| R14 | −1.0372E−04 | 1.1440E−05 | −7.4548E−07 | 2.7097E−08 | −4.2638E−10 |
| R15 | −2.0679E−05 | 1.1658E−06 | −4.0865E−08 | 7.9770E−10 | −6.7343E−12 |
| R16 | −7.3469E−06 | 2.7978E−07 | −6.4047E−08 | 7.7937E−11 | −3.6700E−13 |

TABLE 3

| 2ω (°) | 81.91 |
| Fno | 1.75 |
| f (mm) | 6.727 |
| f1 (mm) | 10.991 |
| f2 (mm) | 8.177 |
| f3 (mm) | −14.191 |
| f4 (mm) | 22.507 |
| f5 (mm) | −16.501 |
| f6 (mm) | 24.988 |
| f7 (mm) | 36.765 |
| f8 (mm) | −6.826 |
| TTL (mm) | 7.816 |
| LB (mm) | 1.034 |
| IH (mm) | 6.016 |
| TTL/IH | 1.299 |

The following Table 13 shows the corresponding values of the parameters defined in the conditions (1) to (6) of the first to fourth embodiments.

Figure 2:
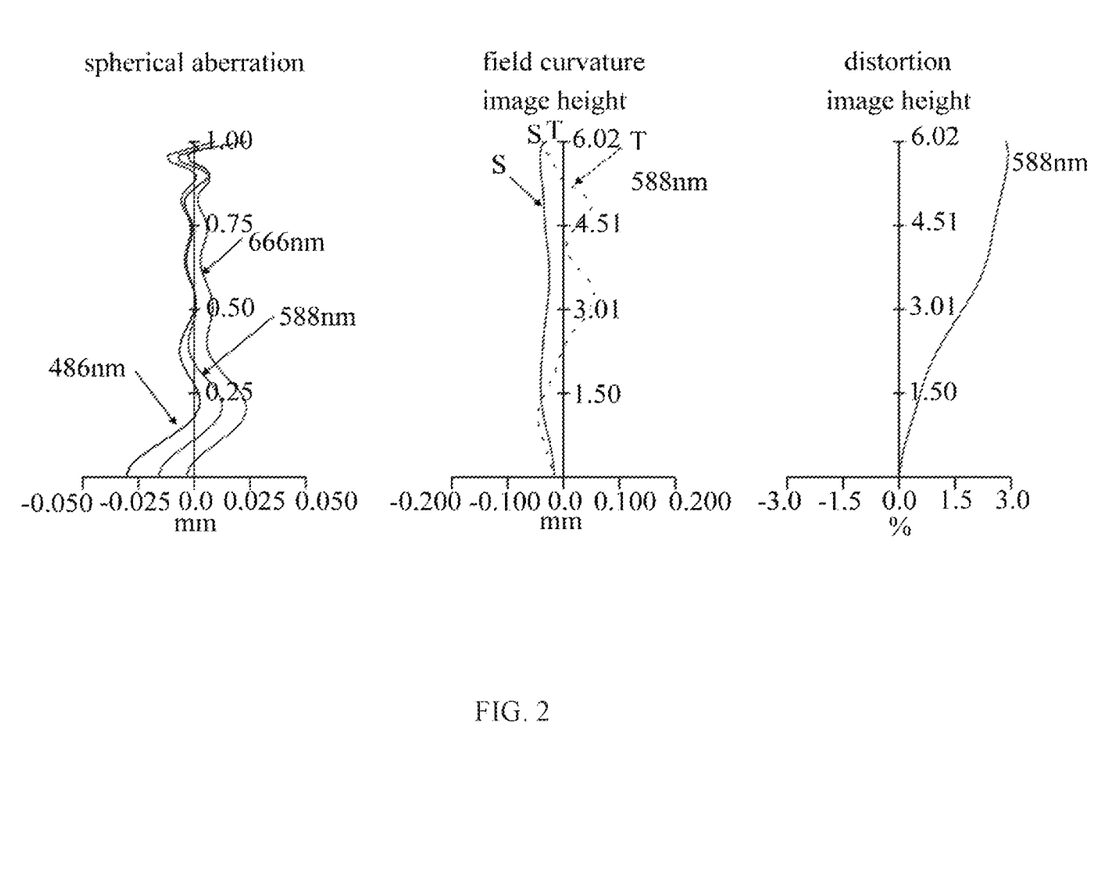
FIG. 2 is diagrams of a spherical aberration, a field curvature, a distortion of the camera lens LA according to the first embodiment of the present invention.

FIG. 2 illustrates a spherical aberration, a field curvature, and a distortion of the camera lens LA according to the first embodiment. In addition, in FIG. 2, S is a field curvature for a sagittal image plane, and T is a field curvature for a meridional image plane, which are the same for the second to fourth embodiments. As shown in FIG. 2, the camera lens LA according to the first embodiment has 2ω=81.91°, the wide-angle and small height, i.e., TTL/IH=1.299, and good optical properties.

Second Embodiment

Figure 3:
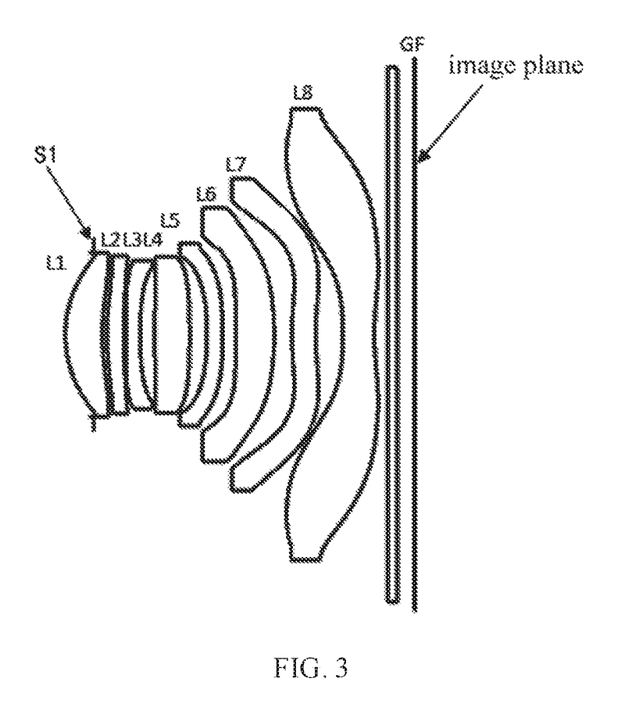
FIG. 3 is a schematic diagram of a camera lens LA according to a second embodiment of the present invention.

FIG. 3 is a schematic diagram of a camera lens LA according to a second embodiment of the present invention. The curvature radiuses R of the image side surfaces and object side surfaces of the first lens L1 to the eighth lens L8 of the camera lens LA according to the second embodiment, the center thicknesses of the lenses, or distances d between the lenses, refractive indexes nd, abbe numbers ν are shown in Table 4; conic coefficients k and aspheric coefficients are shown in Table 5; and 2ω, Fno, f, f1, f2, f3, f4, f5, f6, f7, f8, TTL, and IH are shown in Table 6.

TABLE 4

|  | R | d | nd | νd | Effective radius (mm) |
|---|---|---|---|---|---|
| S1 | ∞ | d0= −0.631 | | | 1.865 |
| R1 | 2.65688 | d1= 0.825 | nd1 1.5806 | ν1 60.08 | 1.872 |
| R2 | 5.73720 | d2= 0.100 | | | 1.834 |
| R3 | 5.92084 | d3= 0.370 | nd2 1.7970 | ν2 40.15 | 1.801 |
| R4 | 11.96197 | d4= 0.062 | | | 1.726 |
| R5 | 122.67565 | d5= 0.307 | nd3 1.6700 | ν3 19.39 | 1.690 |
| R6 | 9.20573 | d6= 0.327 | | | 1.538 |
| R7 | 21.79606 | d7= 0.783 | nd4 1.5444 | ν4 55.82 | 1.570 |
| R8 | −20.06129 | d8= 0.385 | | | 1.780 |
| R9 | −7.82923 | d9= 0.350 | nd5 1.6700 | ν5 19.39 | 1.797 |
| R10 | −13.83898 | d10= 0.298 | | | 2.077 |
| R11 | −21.95791 | d11= 0.855 | nd6 1.5346 | ν6 55.69 | 2.216 |
| R12 | −5.87988 | d12= 0.389 | | | 2.885 |
| R13 | 6.37140 | d13= 0.541 | nd7 1.3700 | ν7 19.39 | 3.050 |
| R14 | 5.73406 | d14= 0.609 | | | 3.558 |
| R15 | −9.50585 | d15= 0.702 | nd8 1.5346 | ν8 55.69 | 4.850 |
| R16 | 5.33646 | d16= 0.300 | | | 5.142 |
| R17 | ∞ | d17= 0.210 | ndg 1.5168 | νg 64.20 | 6.013 |
| R18 | ∞ | d18= 0.403 | | | 6.086 |

Reference wavelength = 558 nm

TABLE 5

| | Conic coefficient | Aspherical coefficient | | | |
|---|---|---|---|---|---|
| | k | A4 | A6 | A8 | A10 |
| R1 | 2.5140E−02 | −4.1320E−03 | 1.1089E−02 | −1.7981E−02 | 1.6466E−02 |
| R2 | 0.0000E+00 | 2.3123E−02 | −8.4108E−02 | 1.0641E−01 | −8.5940E−02 |
| R3 | 0.0000E+00 | 1.0230E−02 | −4.5723E−02 | 3.8066E−02 | −1.2849E−02 |
| R4 | 0.0000E+00 | 5.4691E−03 | −4.3540E−02 | 6.7108E−02 | −5.7505E−02 |
| R5 | 0.0000E+00 | 4.1569E−03 | −1.6450E−02 | 5.1734E−02 | −5.8350E−02 |
| R6 | 0.0000E+00 | −1.2996E−02 | 8.6391E−02 | −1.6816E−01 | 2.1738E−01 |
| R7 | 0.0000E+00 | −3.1476E−03 | −2.4876E−02 | 6.0229E−02 | −8.7199E−02 |
| R8 | 0.0000E+00 | −5.1107E−03 | −2.1557E−03 | 4.4899E−02 | −5.8751E−02 |
| R9 | 0.0000E+00 | −2.2536E−02 | −2.3273E−02 | 4.3213E−02 | −4.9217E−02 |
| R10 | 0.0000E+00 | −1.9814E−02 | −6.4402E−03 | −9.4127E−03 | 1.8191E−02 |
| R11 | 0.0000E+00 | 1.5253E−02 | −1.8657E−04 | −2.2078E−03 | 6.9946E−03 |
| R12 | 0.0000E+00 | 8.7108E−03 | −2.0016E−03 | −5.9529E−03 | 3.9665E−03 |
| R13 | 0.0000E+00 | −2.9331E−02 | −3.9858E−03 | 9.2397E−05 | −2.8641E−04 |
| R14 | 0.0000E+00 | −3.1937E−02 | 1.7781E−03 | −5.2250E−04 | 2.0180E−04 |
| R15 | 0.0000E+00 | −4.0901E−02 | 6.9221E−03 | −4.6605E−04 | 6.1461E−03 |
| R16 | 0.0000E+00 | −3.9190E−02 | 7.7147E−03 | −1.0369E−03 | 9.1378E−05 |

| | Aspherical coefficient | | | | |
|---|---|---|---|---|---|
| | A12 | A14 | A16 | A18 | A20 |
| R1 | −9.4169E−03 | 3.4186E−03 | −7.7694E−04 | 1.0151E−04 | −5.9148E−06 |
| R2 | 4.4515E−02 | −1.4634E−02 | 2.9507E−03 | −3.3314E−04 | 1.6111E−05 |
| R3 | −5.7678E−03 | 7.6803E−03 | −3.1647E−03 | 6.0261E−04 | −4.4705E−05 |
| R4 | 2.9242E−02 | −6.6608E−03 | 3.5983E−05 | 2.8524E−04 | −3.7924E−05 |
| R5 | 3.7529E−02 | −1.3612E−02 | 2.4512E−03 | −1.2711E−04 | −1.0251E−05 |
| R6 | −1.8059E−01 | 9.8181E−02 | −3.1573E−02 | 5.8024E−03 | −4.5500E−04 |
| R7 | 7.9351E−02 | −4.6009E−02 | 1.6551E−02 | −3.3654E−03 | 2.9636E−04 |
| R8 | 4.8284E−02 | −2.5088E−02 | 7.9250E−03 | −1.3864E−03 | 1.0269E−04 |
| R9 | 3.8528E−02 | −1.9691E−02 | 6.1047E−03 | −1.0445E−03 | 7.5621E−05 |
| R10 | −1.3738E−02 | 5.4345E−03 | −1.2751E−03 | 1.6583E−04 | −9.0594E−06 |

TABLE 5-continued

| | | | | | |
|---|---|---|---|---|---|
| R11 | −3.8830E−03 | 1.1324E−03 | −1.8697E−04 | 1.5304E−05 | −3.8895E−07 |
| R12 | −1.2816E−03 | 2.4632E−04 | −2.8311E−05 | 1.7827E−06 | −4.8150E−08 |
| R13 | 1.9691E−04 | −5.4745E−05 | 7.4847E−06 | −4.9909E−07 | 1.2993E−09 |
| R14 | −3.2294E−05 | 1.7887E−06 | 6.6219E−08 | −1.0883E−06 | 3.1604E−10 |
| R15 | 8.7223E−07 | −5.8718E−09 | 1.6241E−09 | −2.0687E−11 | 8.9273E−14 |
| R16 | −5.4931E−06 | 2.2719E−07 | −6.2643E−09 | 1.0422E−10 | −7.8948E−13 |

TABLE 6

| | |
|---|---|
| 2ω (°) | 83.78 |
| Fno | 1.75 |
| f (mm) | 6.526 |
| f1 (mm) | 7.760 |
| f2 (mm) | 14.322 |
| f3 (mm) | −13.140 |
| f4 (mm) | 19.317 |
| f5 (mm) | −27.554 |
| f6 (mm) | 14.748 |
| f7 (mm) | −129.721 |
| f8 (mm) | −6.290 |
| TTL (mm) | 7.815 |
| LB (mm) | 0.913 |
| IH (mm) | 6.016 |
| TTL/IH | 1.299 |

As shown in Table 13, the second embodiment satisfies the conditions (1) to (6).

Figure 4:
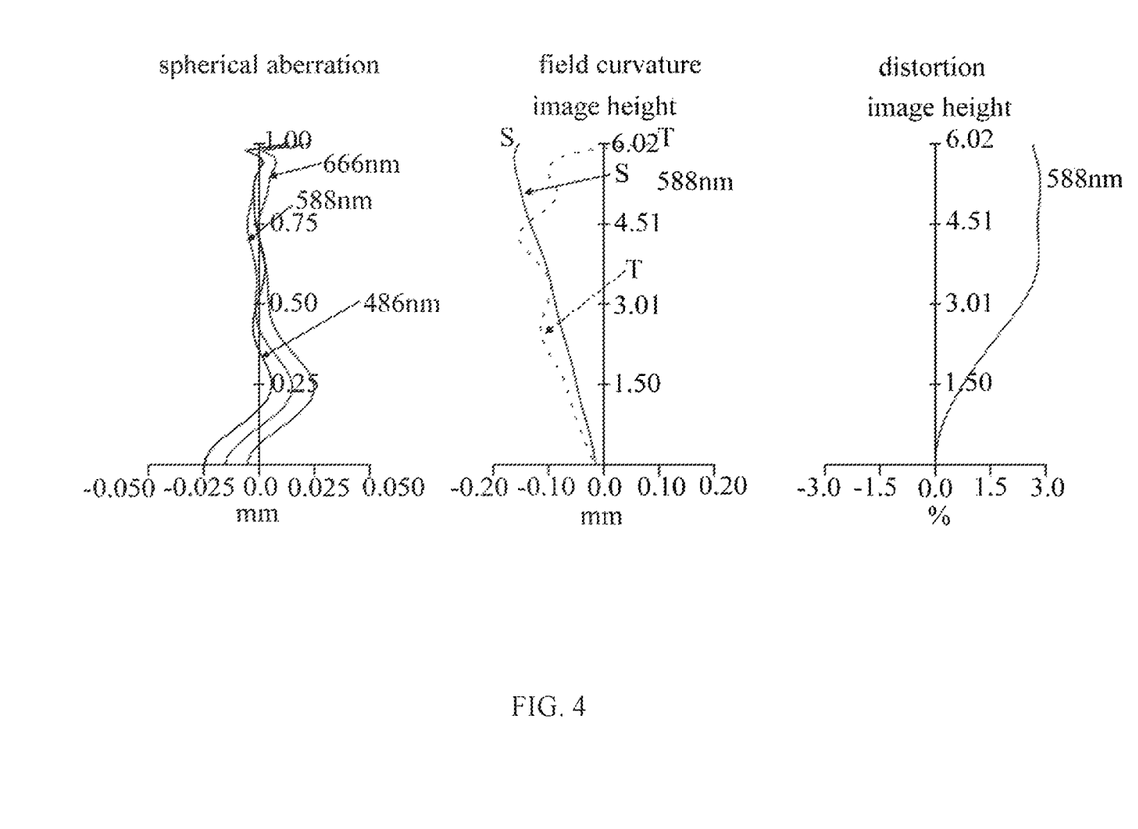
FIG. 4 is diagrams of a spherical aberration, a field curvature, a distortion of the camera lens LA according to the second embodiment of the present invention.

FIG. 4 illustrates a spherical aberration, a field curvature, and a distortion of the camera lens LA according to the second embodiment. As shown in FIG. 4, the camera lens LA according to the second embodiment has 2ω=83.78°, the wide-angle and small height, i.e., TTL/IH=1.299, and good optical properties.

Third Embodiment

Figure 5:
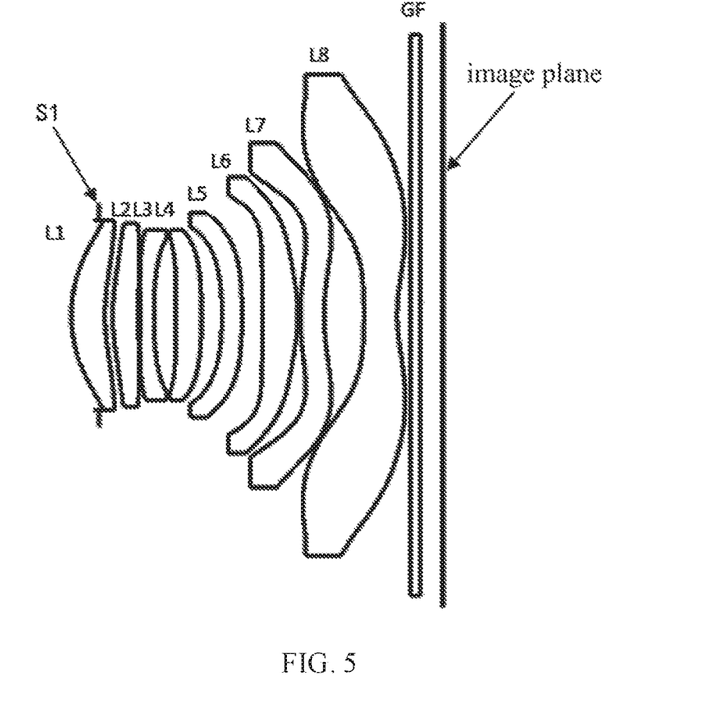
FIG. 5 is a schematic diagram of a camera lens LA according to a third embodiment of the present invention.

FIG. 5 is a schematic diagram of a camera lens LA according to a third embodiment of the present invention. The curvature radiuses R of the image side surfaces and object side surfaces of the first lens L1 to the eighth lens L8 of the camera lens LA according to the third embodiment, the center thicknesses of the lenses, or distances d between the lenses, refractive indexes nd, abbe numbers ν are shown in Table 7; conic coefficients k and aspheric coefficients are shown in Table 8; and 2ω, Fno, f, f1, f2, f3, f4, f5, f6, f7, f8, TTL, and IH are shown in Table 9.

TABLE 7

| | R | d | | nd | | νd | Effective radius (mm) |
|---|---|---|---|---|---|---|---|
| S1 | ∞ | d0= | −0.608 | | | | 2.048 |
| R1 | 2.90041 | d1= | 0.728 | nd1 1.5346 | ν1 | 55.69 | 2.047 |
| R2 | 4.63270 | d2= | 0.168 | | | | 2.015 |
| R3 | 4.63340 | d3= | 0.544 | nd2 1.7504 | ν2 | 44.94 | 1.979 |
| R4 | 11.58467 | d4= | 0.048 | | | | 1.913 |
| R5 | −125.93669 | d5= | 0.300 | nd3 1.6700 | ν3 | 19.39 | 1.840 |
| R6 | 12.69267 | d6= | 0.472 | | | | 1.660 |
| R7 | 363.47224 | d7= | 0.555 | nd4 1.5444 | ν4 | 55.82 | 1.670 |
| R8 | −13.04663 | d8= | 0.437 | | | | 1.845 |
| R9 | −8.82722 | d9= | 0.438 | nd5 1.6700 | ν5 | 19.39 | 1.920 |
| R10 | −15.73298 | d10= | 0.446 | | | | 2.216 |
| R11 | −35.45055 | d11= | 0.757 | nd6 1.5346 | ν6 | 55.69 | 2.601 |
| R12 | −3.71093 | d12= | 0.060 | | | | 2.988 |
| R13 | 7.97464 | d13= | 0.525 | nd7 1.6700 | ν7 | 19.39 | 3.072 |
| R14 | 5.55296 | d14= | 0.859 | | | | 3.729 |
| R15 | −16.24708 | d15= | 0.718 | nd8 1.5346 | ν8 | 55.69 | 4.750 |
| R16 | 3.69534 | d16= | 0.300 | | | | 5.201 |
| R17 | ∞ | d17= | 0.210 | ndg 1.5168 | νg | 64.20 | 5.984 |
| R18 | ∞ | d18= | 0.487 | | | | 6.051 |

Reference wavelength = 558 nm

TABLE 8

| | Conic coefficient | Aspherical coefficient | | | |
|---|---|---|---|---|---|
| | k | A4 | A6 | A8 | A10 |
| R1 | −4.7875E−03 | −5.4017E−03 | 8.0217E−03 | −1.0372E−02 | 7.2266E−03 |
| R2 | 0.0000E+00 | −1.2771E−02 | −3.5679E−03 | 1.0443E−03 | −1.3812E−04 |
| R3 | 0.0000E+00 | −1.2081E−02 | −7.0703E−03 | 5.1899E−03 | −3.2217E−03 |
| R4 | 0.0000E+00 | −2.2467E−02 | 5.8990E−03 | 2.9606E−03 | −9.0165E−03 |
| R5 | 0.0000E+00 | −4.1787E−03 | 1.8226E−02 | −1.0386E−02 | 5.4341E−04 |
| R6 | 0.0000E+00 | 1.6974E−02 | 4.0554E−03 | 3.9773E−03 | −1.4990E−02 |
| R7 | 0.0000E+00 | −9.4547E−03 | −1.4809E−02 | 3.7260E−03 | −5.8976E−02 |
| R8 | 0.0000E+00 | −1.7780E−02 | 8.0868E−03 | −1.8965E−02 | 2.1604E−02 |
| R9 | 0.0000E+00 | −3.8750E−02 | 2.2918E−02 | −2.6526E−02 | 1.9087E−02 |
| R10 | 0.0000E+00 | −3.9053E−02 | 2.3514E−02 | −2.0103E−02 | 1.0251E−02 |
| R11 | 0.0000E+00 | −1.4391E−02 | 3.0233E−02 | −2.2523E−02 | 8.9178E−03 |
| R12 | 0.0000E+00 | 3.6450E−02 | −7.3939E−03 | 5.1408E−04 | 5.0684E−05 |

TABLE 8-continued

| | | | | |
|---|---|---|---|---|
| R13 | 0.0000E+00 | 2.4773E−02 | −2.8491E−02 | 8.9153E−03 | −1.7816E−03 |
| R14 | 0.0000E+00 | 5.8110E−03 | −1.6284E−02 | 5.9155E−03 | −1.3236E−03 |
| R15 | 0.0000E+00 | −3.0480E−02 | 8.0168E−04 | 6.3388E−04 | −9.1908E−05 |
| R16 | 0.0000E+00 | −3.9215E−02 | 6.3271E−03 | −8.2308E−04 | 8.1291E−05 |

| | Aspherical coefficient | | | | |
|---|---|---|---|---|---|
| | A12 | A14 | A16 | A18 | A20 |
| R1 | −3.1008E−03 | 7.9875E−04 | −1.1940E−04 | 9.1077E−06 | −2.4353E−07 |
| R2 | −6.3466E−05 | 8.7227E−05 | −3.1578E−05 | 4.4254E−06 | −1.9365E−07 |
| R3 | 1.3196E−03 | −1.7939E−04 | −3.7905E−05 | 1.3306E−05 | −1.0120E−06 |
| R4 | 7.9632E−03 | −3.5685E−03 | 8.7276E−04 | −1.1146E−04 | 5.8666E−06 |
| R5 | 2.4554E−03 | −1.1939E−03 | 2.0083E−04 | −1.6712E−06 | −1.9903E−06 |
| R6 | 1.5606E−02 | −8.6066E−03 | 2.7618E−03 | −4.8425E−04 | 3.5992E−05 |
| R7 | 5.4361E−02 | −3.0400E−02 | 1.0187E−02 | −1.8687E−03 | 1.4544E−04 |
| R8 | −1.5759E−02 | 7.2681E−03 | −2.0428E−03 | 3.1960E−04 | −2.1468E−05 |
| R9 | −8.8011E−03 | 2.5093E−03 | −4.0060E−04 | 2.6655E−05 | 0.0000E+00 |
| R10 | −3.1319E−03 | 5.2912E−04 | −3.0547E−05 | −3.6856E−06 | 5.1993E−07 |
| R11 | −2.1808E−03 | 3.1798E−04 | −2.3476E−05 | 3.2023E−07 | 3.8777E−08 |
| R12 | −5.1506E−05 | 1.4862E−05 | −1.9334E−06 | 1.1594E−07 | −2.5601E−09 |
| R13 | 1.7511E−04 | −6.6559E−07 | −1.6109E−06 | 1.4804E−07 | −4.4281E−09 |
| R14 | 1.9120E−04 | −1.7749E−05 | 1.0216E−06 | −3.3069E−09 | 4.5811E−10 |
| R15 | 5.9285E−06 | −1.9953E−07 | 3.0423E−09 | −6.8537E−13 | −3.6653E−13 |
| R16 | −5.7120E−06 | 2.6841E−07 | −7.9212E−09 | 1.3232E−10 | −9.5368E−13 |

TABLE 9

| | |
|---|---|
| 2ω (°) | 85.50 |
| Fno | 1.55 |
| f (mm) | 6.354 |
| f1 (mm) | 12.656 |
| f2 (mm) | 9.957 |
| f3 (mm) | −17.208 |
| f4 (mm) | 23.148 |
| f5 (mm) | −30.800 |
| f6 (mm) | 7.550 |
| f7 (mm) | −29.894 |
| f8 (mm) | −5.562 |
| TTL (mm) | 8.053 |
| LB (mm) | 0.997 |
| IH (mm) | 6.016 |
| TTL/IH | 1.339 |

As shown in Table 13, the third embodiment satisfies the conditions (1) to (6).

Figure 6:
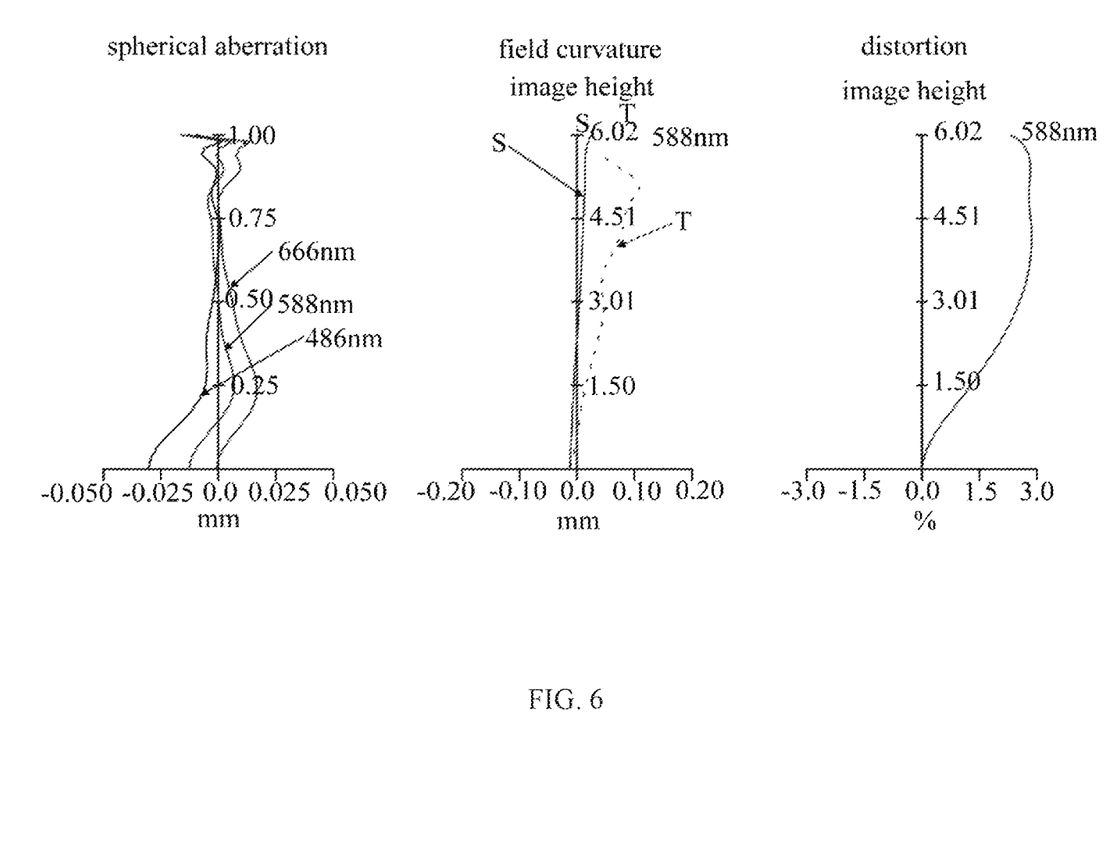
FIG. 6 is diagrams of a spherical aberration, a field curvature, a distortion of the camera lens LA according to the third embodiment of the present invention.

FIG. 6 illustrates a spherical aberration, a field curvature, and a distortion of the camera lens LA according to the third embodiment. As shown in FIG. 6, the camera lens LA according to the second embodiment has 2ω=85.50°, the wide-angle and small height, i.e., TTL/IH=1.339, and good optical properties.

Fourth Embodiment

Figure 7:
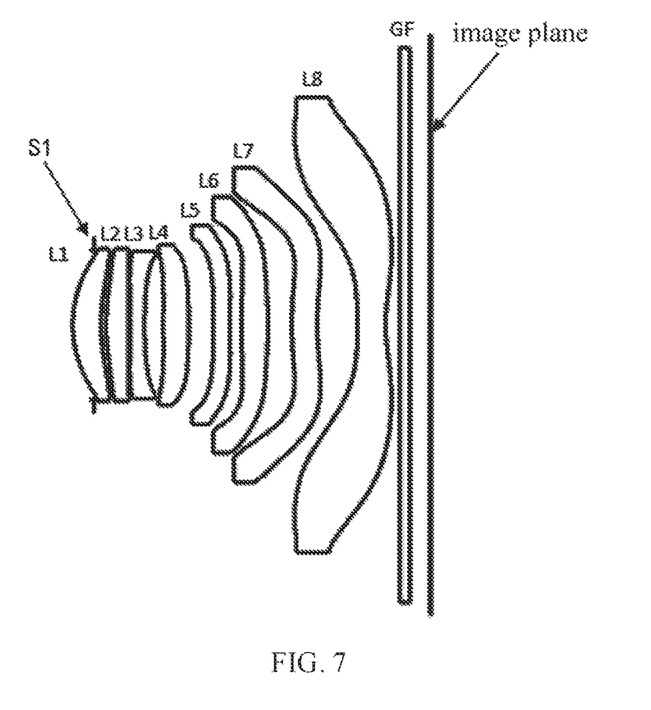
FIG. 7 is a schematic diagram of a camera lens LA according to a fourth embodiment of the present invention.

FIG. 7 is a schematic diagram of a camera lens LA according to a fourth embodiment of the present invention. The curvature radiuses R of the image side surfaces and object side surfaces of the first lens L1 to the eighth lens L8 of the camera lens LA according to the fourth embodiment, the center thicknesses of the lenses, or distances d between the lenses, refractive indexes nd, abbe numbers ν are shown in Table 10; conic coefficients k and aspheric coefficients are shown in Table 11; and 2ω, Fno, f, f1, f2, f3, f4, f5, f6, f7, f8, TTL, and IH are shown in Table 12.

TABLE 10

| | R | d | | nd | | νd | Effective radius (mm) |
|---|---|---|---|---|---|---|---|
| S1 | ∞ | d0= | −0.451 | | | | 1.616 |
| R1 | 2.57009 | d1= | 0.594 | nd1 | 1.5346 | ν1 55.69 | 1.638 |
| R2 | 4.23256 | d2= | 0.107 | | | | 1.640 |
| R3 | 4.89678 | d3= | 0.472 | nd2 | 1.7015 | ν2 41.15 | 1.643 |
| R4 | 12.24421 | d4= | 0.038 | | | | 1.599 |
| R5 | −89.10499 | d5= | 0.300 | nd3 | 1.6700 | ν3 19.39 | 1.590 |
| R6 | 14.85083 | d6= | 0.387 | | | | 1.510 |
| R7 | 46.82609 | d7= | 0.531 | nd4 | 1.5444 | ν4 55.82 | 1.584 |
| R8 | −31.29811 | d8= | 0.518 | | | | 1.739 |
| R9 | 60.02435 | d9= | 0.350 | nd5 | 1.6700 | ν5 19.39 | 1.890 |
| R10 | 18.89989 | d10= | 0.249 | | | | 2.165 |
| R11 | −35.71857 | d11= | 0.558 | nd6 | 1.5346 | ν6 55.69 | 2.295 |
| R12 | −5.08997 | d12= | 0.493 | | | | 2.771 |
| R13 | 10.38912 | d13= | 0.525 | nd7 | 1.6700 | ν7 19.39 | 2.866 |
| R14 | 9.44316 | d14= | 0.844 | | | | 3.405 |
| R15 | −13.68731 | d15= | 0.591 | nd8 | 1.5346 | ν8 55.69 | 4.620 |
| R16 | 3.63522 | d16= | 0.300 | | | | 4.932 |
| R17 | ∞ | d17= | 0.210 | ndg | 1.5168 | νg 64.20 | 5.925 |
| R18 | ∞ | d18= | 0.432 | | | | 6.007 |

Reference wavelength = 558 nm

TABLE 11

| | Conic coefficient | Aspherical coefficient | | | |
|---|---|---|---|---|---|
| | k | A4 | A6 | A8 | A10 |
| R1 | 2.1295E−02 | −4.5337E−03 | 7.9025E−03 | −1.0493E−02 | 7.1576E−03 |
| R2 | 0.0000E+00 | −2.4195E−02 | 2.8339E−02 | −2.7532E−02 | −1.7804E−03 |
| R3 | 0.0000E+00 | −3.0530E−02 | 3.6407E−02 | −5.1823E−02 | 4.3372E−02 |
| R4 | 0.0000E+00 | −1.1695E−01 | 2.2439E−01 | −3.2278E−01 | 3.2580E−01 |
| R5 | 0.0000E+00 | −9.9179E−02 | 2.5519E−01 | −3.6087E−01 | 3.5171E−01 |
| R6 | 0.0000E+00 | 3.0444E−03 | 6.7982E−02 | −1.2427E−01 | 1.6029E−01 |
| R7 | 0.0000E+00 | −2.6952E−02 | 3.8687E−02 | −8.6758E−02 | 1.1918E−01 |
| R8 | 0.0000E+00 | −1.8582E−02 | −1.0111E−02 | 2.8921E−02 | −4.3397E−02 |
| R9 | 0.0000E+00 | −4.7291E−02 | 1.1843E−02 | 9.0630E−03 | −1.5537E−02 |
| R10 | 0.0000E+00 | −3.0643E−02 | −8.1913E−03 | 9.3655E−03 | −3.0833E−03 |
| R11 | 0.0000E+00 | 7.1505E−02 | −6.4087E−02 | 2.5393E−02 | −3.0609E−03 |
| R12 | 0.0000E+00 | 9.7373E−02 | −7.7974E−02 | 4.0148E−02 | −1.3822E−02 |
| R13 | 0.0000E+00 | 5.1094E−02 | −6.5669E−02 | 2.7991E−02 | −7.2092E−03 |
| R14 | 0.0000E+00 | 4.0001E−02 | −5.0873E−02 | 2.1144E−02 | −5.2760E−03 |
| R15 | 0.0000E+00 | −4.1994E−02 | 7.5468E−03 | −8.8102E−04 | 9.9284E−05 |
| R16 | −9.5022E−01 | −6.1247E−02 | 1.5265E−02 | −2.6262E−03 | 3.0245E−04 |

| | Aspherical coefficient | | | | |
|---|---|---|---|---|---|
| | A12 | A14 | A16 | A18 | A20 |
| R1 | −3.1236E−03 | 7.9575E−04 | −1.1876E−04 | 6.9921E−06 | −6.3232E−07 |
| R2 | 1.8171E−02 | −1.4030E−02 | 5.5385E−03 | −1.1832E−03 | 1.0703E−04 |
| R3 | −3.1830E−02 | 1.9924E−02 | −7.9660E−03 | 1.6903E−03 | −1.4416E−04 |
| R4 | −2.3500E−01 | 1.2204E−01 | −4.3009E−02 | 8.9797E−03 | −8.1796E−04 |
| R5 | −2.4165E−01 | 1.1994E−01 | −4.0364E−02 | 6.3472E−03 | −7.7160E−04 |
| R6 | −1.4545E−01 | 8.8426E−02 | −3.3944E−02 | 7.3741E−03 | −6.8781E−04 |
| R7 | −1.0505E−01 | 5.7965E−02 | −1.9110E−02 | 3.3932E−03 | −2.4312E−04 |
| R8 | 3.6736E−02 | −1.9394E−02 | 6.2755E−03 | −1.1360E−03 | 8.7834E−05 |
| R9 | 9.9777E−03 | −3.5654E−03 | 6.7291E−04 | −5.2359E−05 | 0.0000E+00 |
| R10 | −3.2723E−04 | 5.9913E−04 | −2.1130E−04 | 3.3771E−05 | −2.0574E−06 |
| R11 | −2.3233E−03 | 1.2603E−03 | −2.7317E−04 | 2.7881E−05 | −1.0697E−06 |
| R12 | 2.9427E−03 | −3.6404E−04 | 2.3126E−04 | −4.6040E−07 | −1.1246E−06 |
| R13 | 1.2164E−03 | −1.5317E−04 | 1.5296E−05 | −1.0125E−06 | 2.9953E−08 |
| R14 | 8.4250E−04 | −8.6973E−05 | 5.6467E−05 | −2.1019E−07 | 3.4204E−09 |
| R15 | −9.1601E−06 | 5.6372E−07 | −2.1096E−08 | 4.3530E−10 | −3.8096E−12 |
| R16 | −2.3396E−05 | 1.1911E−06 | −3.7962E−08 | 6.8400E−10 | −5.2877E−12 |

TABLE 12

| | |
|---|---|
| 2ω (°) | 85.97 |
| Fno | 1.95 |
| f (mm) | 6.303 |
| f1 (mm) | 10.885 |
| f2 (mm) | 11.333 |
| f3 (mm) | −18.978 |
| f4 (mm) | 34.543 |
| f5 (mm) | −41.316 |
| f6 (mm) | 10.834 |
| f7 (mm) | −199.137 |
| f8 (mm) | −5.310 |
| TTL (mm) | 7.500 |
| LB (mm) | 0.942 |
| IH (mm) | 6.016 |
| TTL/IH | 1.247 |

As shown in Table 13, the fourth embodiment satisfies the conditions (1) to (6).

Figure 8:
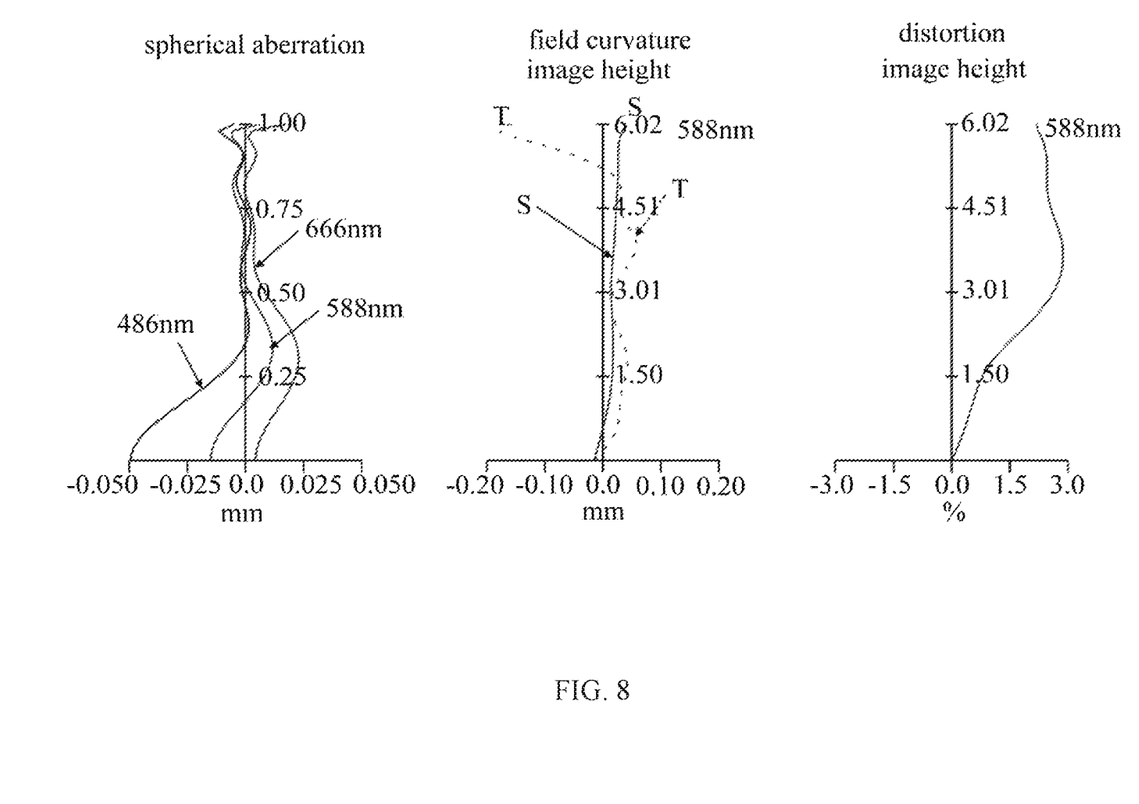
FIG. 8 is diagrams of a spherical aberration, a field curvature, a distortion of the camera lens LA according to the fourth embodiment of the present invention.

FIG. 8 illustrates a spherical aberration, a field curvature, and a distortion of the camera lens LA according to the fourth embodiment. As shown in FIG. 8, the camera lens LA according to the second embodiment has 2ω=85.97°, the wide-angle and small height, i.e., TTL/IH=1.247, and good optical properties.

Table 13 shows the values of the parameter defined in the conditions (1) to (6) of the first to fourth embodiments.

TABLE 13

| | Embodiment 1 | Embodiment 2 | Embodiment 3 | Embodiment 4 | Notes |
|---|---|---|---|---|---|
| ν1 − ν2 | 5.047 | 19.929 | 10.759 | 14.546 | condition (1) |
| ν2 − ν3 | 29.129 | 20.758 | 25.543 | 21.757 | condition (2) |
| (d1 + d3)/d2 | 4.050 | 11.950 | 7.563 | 10.000 | condition (3) |
| R3/R4 | 0.305 | 0.495 | 0.400 | 0.400 | condition (4) |
| |R5/R6| | 3.050 | 14.950 | 10.000 | 6.000 | condition (5) |
| d4/f | 0.006 | 0.009 | 0.008 | 0.006 | condition (6) |

What is claimed is:

1. A camera lens, comprising, sequentially from an object side:
   a first lens having a positive refractive power;
   a second lens having a positive refractive power;
   a third lens having a negative refractive power;
   a fourth lens having a positive refractive power;
   a fifth lens having a negative refractive power;
   a sixth lens having a positive refractive power;
   a seventh lens having a positive or negative refractive power; and
   an eighth lens having a negative refractive power,
   wherein the camera lens satisfies following conditions:

$$5.00 \leq v1-v2 \leq 20.00; \text{ and}$$

$$20.00 \leq v2-v3 \leq 30.00,$$

where
   v1 denotes an abbe number of the first lens;
   v2 denotes an abbe number of the second lens; and
   v3 denotes an abbe number of the third lens.

2. The camera lens as described in claim 1, further satisfying a following condition:

$$4.00 \leq (d1+d3)/d2 \leq 12.00,$$

where
   d1 denotes a center thickness of the first lens;
   d2 denotes an on-axis distance from an image side surface of the first lens to an object side surface of the second lens; and
   d3 denotes a center thickness of the second lens.

3. The camera lens as described in claim 1, further satisfying a following condition:

$$0.30 \leq R3/R4 \leq 0.50,$$

where
   R3 denotes a curvature radius of an object side surface of the second lens; and
   R4 denotes a curvature radius of an image side surface of the second lens.

4. The camera lens as described in claim 1, further satisfying a following condition:

$$3.00 \leq |R5/R6| \leq 15.00,$$

where
   R5 denotes a curvature radius of an object side surface of the third lens; and
   R6 denotes a curvature radius of an image side surface of the third lens.

5. The camera lens as described in claim 1, further satisfying a following condition:

$$0.005 \leq d4/f \leq 0.010,$$

where
   f denotes a focal length of the camera lens; and
   d4 denotes an on-axis distance from an image side surface of the second lens to an object side surface of the third lens.

* * * * *